United States Patent [19]

Bushnell

[11] 4,426,361
[45] Jan. 17, 1984

[54] EXTRACTION ZONE TRAY

[75] Inventor: James D. Bushnell, Berkeley Heights, N.J.

[73] Assignee: Exxon Research and Engineering Co., Florham Park, N.J.

[21] Appl. No.: 450,682

[22] Filed: Dec. 17, 1982

[51] Int. Cl.³ ............................................. B01D 11/04
[52] U.S. Cl. ................................ 422/256; 196/14.52; 202/158; 210/511; 261/114 R
[58] Field of Search ............ 261/113, 114 R, 114 TC, 261/114 JP; 210/511, DIG. 5; 196/14.52; 202/158; 422/255, 256

[56] References Cited

U.S. PATENT DOCUMENTS

| 545,392 | 8/1895 | Tracy | 422/256 X |
|---|---|---|---|
| 2,759,872 | 8/1956 | Claridge et al. | 196/14.52 |
| 2,767,966 | 10/1956 | Chave | 261/113 |
| 2,768,071 | 10/1956 | Pokorny et al. | 422/256 |
| 2,775,542 | 12/1956 | Carver | 422/256 X |
| 2,900,238 | 8/1959 | Jones | 422/256 |
| 3,053,520 | 9/1962 | Streuber | 261/114 R |
| 3,105,105 | 9/1963 | Kittel | 261/114 R X |
| 3,215,504 | 11/1965 | Hagbarth | 261/114 R |
| 3,899,299 | 8/1975 | Bushnell et al. | 196/14.52 |

Primary Examiner—Richard L. Chiesa
Attorney, Agent, or Firm—Edward H. Mazer

[57] ABSTRACT

An improved tray means and an extraction zone utilizing the tray means are disclosed. The tray means comprises a tray deck, a channel means, and a weir means. The tray deck and channel means cooperate to form a fluid conduit through which fluid flows from beneath the tray deck to the weir means. The tray means is useful in cross flow liquid-liquid extraction zones, with particular applicability to extractive purification of lube oils.

16 Claims, 6 Drawing Figures

EXTRACTION ZONE TRAY

BACKGROUND OF THE INVENTION

This invention is directed at an improved extraction zone tray and to an extraction zone comprising one or more of the subject trays. The present invention is of particular applicability in liquid-liquid extraction zones wherein a contaminant is removed from a feedstream.

Solvent extraction is well-known and has been used for many years for product separation. In the petroleum industry solvent extraction has been widely used for the removal of impurities from process streams, such as the removal of aromatic compounds from lube oil feedstocks. In liquid-liquid extraction one or more components in the liquid mixture are removed by intimate contact with another liquid which is selectively miscible either with the impurities or with the desired product. Liquid-liquid extractions may be carried out in a number of different ways, such as by batch, co-current or counter-current extraction. Countercurrent extraction frequently is a preferred method for effecting the extraction, since it is continuous and since fresh solvent typically contacts the product just before the product exits from the extraction zone. Usually the solvent utilized is selectively miscible with the impurity to be removed but not miscible, or only slightly miscible, with the product. Countercurrent solvent extraction techniques are widely used in the petroleum industry for effecting product purification. In the manufacture of lube oils, the lube oil feedstock frequently is passed through a countercurrent extraction zone to remove product impurities, such as undesired aromatic components. Solvents frequently employed for extracting the aromatic components from the lube oil feedstock include phenol and N-methyl pyrrolidone (NMP).

When it is necessary to increase the throughput of a lube extraction unit, for example because of increased product demand or because lower yields from a poorer crude require a higher feed rate, the solvent recovery sections of the plant often can be expanded by conventional means, such as more heat exchange, additional flash drums, larger pumps, or larger capacity control valves. The ability of the internals in the solvent contacting tower to handle the increased load then may become the limiting portion of the plant. Therefore, it would be desirable to provide internals for the countercurrent contacting which have higher capacity per unit of tower cross-sectional area than internals currently in use while retaining hydraulic stability and effective contacting for mass transfer. The design of such trays is complicated by the fact that several feedstocks of different density, viscosity and yield are often processed in the same extraction zone at different feed rates, temperatures and solvent treats. Moreover, for a given feedstock the flow rates vary considerably within the extraction zone from tray to tray, thus requiring a great deal of hydraulic flexibility for the trays. Furthermore, these systems are usually characterized by very low interfacial tension, so that while mixing and mass transfer are easy, subsequent separation of the phases by settling and coalescence is difficult. Thus, a problem encountered in the design of extraction zones is minimizing excess mixing to thereby avoid emulsion formation, excess recirculation and turbulence.

Another problem encountered in the design of extraction zones is the problem created by the reverse in the direction of the lighter phase as it flows upwardly through the extraction zone. Sharp reversals in the light phase flow path are believed to promote entrainment of the heavy phase with the light phase.

Yet another problem encountered in the design of extraction facilities has concerned the problem attendant with the scale-up of extraction zones. Frequently, as higher feed rates are proposed, the diameters of the extraction zones have been increased to maintain the same specific through-put in terms, for example, of barrels per day per square foot. Since the cross-section area available for fluid flow between the stages increases with the diameter, whereas the superficial cross-section of the extraction zone increases as the square of the diameter, a larger diameter extraction zone with the same specific through-put will involve a higher flow velocity between the trays than a smaller diameter extraction zone of the same tray spacing. It has been found that this higher flow velocity adversely affects extraction zone performance.

Yet another problem encountered in the design of extraction zones has been the necessity for installing support beams, such as I beams, beneath the tray decks for support especially in large diameter towers, since the normally flat sheet metal trays typically do not have sufficient strength to support personnel during construction and maintenance of the tower internals. These beams normally do not contribute to process performance. They must be carefully designed to permit access for maintenance of the tower internals while not affecting the tower hydraulics.

Still another problem encountered in extraction zone design has concerned tray fouling from sludge accumulation.

Previously, efforts have been made to improve the extractive process primarily by improving extraction tower internals. U.S. Pat. No. 3,899,299 discloses a countercurrent extraction zone in which the less dense feedstock enters at the bottom of the extraction zone, while the more dense solvent enters at the top. A series of horizontally disposed, vertically spaced-apart trays are located in the zone. The less dense feed rising through the column flows under the tray, over a damlike device and passes into cascade weir means located at substantially the same elevation as the tray. The perforate plate of the weir means causes the feed to be broken into small droplets, which pass upwardly to the area beneath the next higher tray, where the droplets coalesce. This process of droplet formation and coalescence is repeated at each tray in the extraction zone. Simultaneously, solvent passes downwardly flowing generally across the top of each tray removing impurities from the droplets of feed rising through the solvent. It has been found that this design may not be completely satisfactory at relatively high feed rates because the build-up of oil under each tray, particularly the bottom tray, resulted in a loss of the lube oil which was entrained in the bottom extract stream.

U.S. Pat. No. 3,053,520 describes a gas-liquid separation zone in which a plurality of troughs are disposed on each tray of the extraction zone. Each trough has a cover with a serrated surface to distribute the gas evenly through the liquid at each tray. This design is not attractive for liquid-liquid extraction zones. In vapor-liquid separation, the density difference between the vapor and liquid is great so that a relatively quiescent settling zone is not necessary. By contrast, in liquid-liquid separation zones discrete mixing and settling zones must be provided.

U.S. Pat. No. 2,759,872 is directed at a liquid-liquid extraction zone in which each tray includes a rectangular riser having a series of partitions disposed beneath downcomers. The laminar flow from the rectangular risers is dispersed into droplets by the downwardly flowing heavy phase. This design is not desirable because the parallel baffles which form the riser and discharge channels must be very close together to achieve low velocity laminar flow by frictional resistance. These small channels are susceptible to plugging with dirt, scale and corrosion by-products. In addition, the velocity through the discharge baffles, which is necessary to provide the desired frictional resistance, may induce entrainment of the heavy phase in the light phase. Moreover, since restrictive orifices are not used to reduce pressure drop, the riser height above the tray must be relatively great for an effective hydraulic seal without excessive recirculation of the heavy phase.

It is desirable to provide an improved extraction tray for an extraction zone which minimizes stage-to-stage entrainment of the heavy phase with the light phase.

It also is desirable to provide an extraction tray with improved phase separation at high horizontal flow velocities.

It also is desirable to provide an improved extraction tray in which strength and support for the tray deck is incorporated into the tray design, rather than by the use of extraneous beams.

It also is desirable to provide an extraction zone which does not become easily fouled with sludge.

The present invention is directed at an improved extraction tray in which a channel means communicates with the tray deck. The channel means provides strength for the tray deck and also provides a fluid conduit for directing fluid from beneath the tray to a weir means associated with the tray.

SUMMARY OF THE INVENTION

The present invention is directed at a tray means for an extraction zone and an extraction zone utilizing said tray means. The tray means comprises:

(A) a tray deck;

(B) a channel means cooperating with said tray deck to form a fluid conduit; and (C) a weir means, communicating with the fluid conduit, whereby fluid passes through the fluid conduit before passing through said weir means.

The channel means preferably is imperforate and preferably is disposed above the tray deck. In a preferred embodiment the tray means comprises a plurality of substantially parallel channel means on the tray deck. The weir means preferably comprises a cascade weir means.

The subject tray means is of particular utility in an extraction zone comprising one or more of the aforementioned tray means. The extraction zone, adapted for the separation of a feed having a first component and a second component by contacting the feed with a solvent having a density differing from that of the feed to thereby form a relatively light phase and a relatively heavy phase, comprises:

(A) a tower having vertically spaced-apart feed and solvent inlets and vertically spaced-apart light phase and heavy phase outlets;

(B) a tray means disposed in said tower, said tray means comprising:

(i) a tray deck;
(ii) a channel means cooperating with said tray deck to form a fluid conduit; and
(iii) a weir means communicating with said fluid conduit, whereby light phase passing through the fluid conduit and said weir means is dispersed into a plurality of droplets which pass upwardly and coalesce, the light phase and heavy phase subsequently exiting the tower through the respective outlets.

The subject extraction zone may comprise a single pass or a multi-pass zone. The extraction zone preferably is designed for cross flow operation. In a preferred embodiment the weir means comprises a cascade weir means and the channel means comprises a generally U-shaped member. The aforementioned extraction tray means and extraction zone are of particular utility in liquid-liquid extraction, with a particularly preferred application being the extractive purification of lube oil.

DETAILED DESCRIPTION OF THE INVENTION

Figure 1:
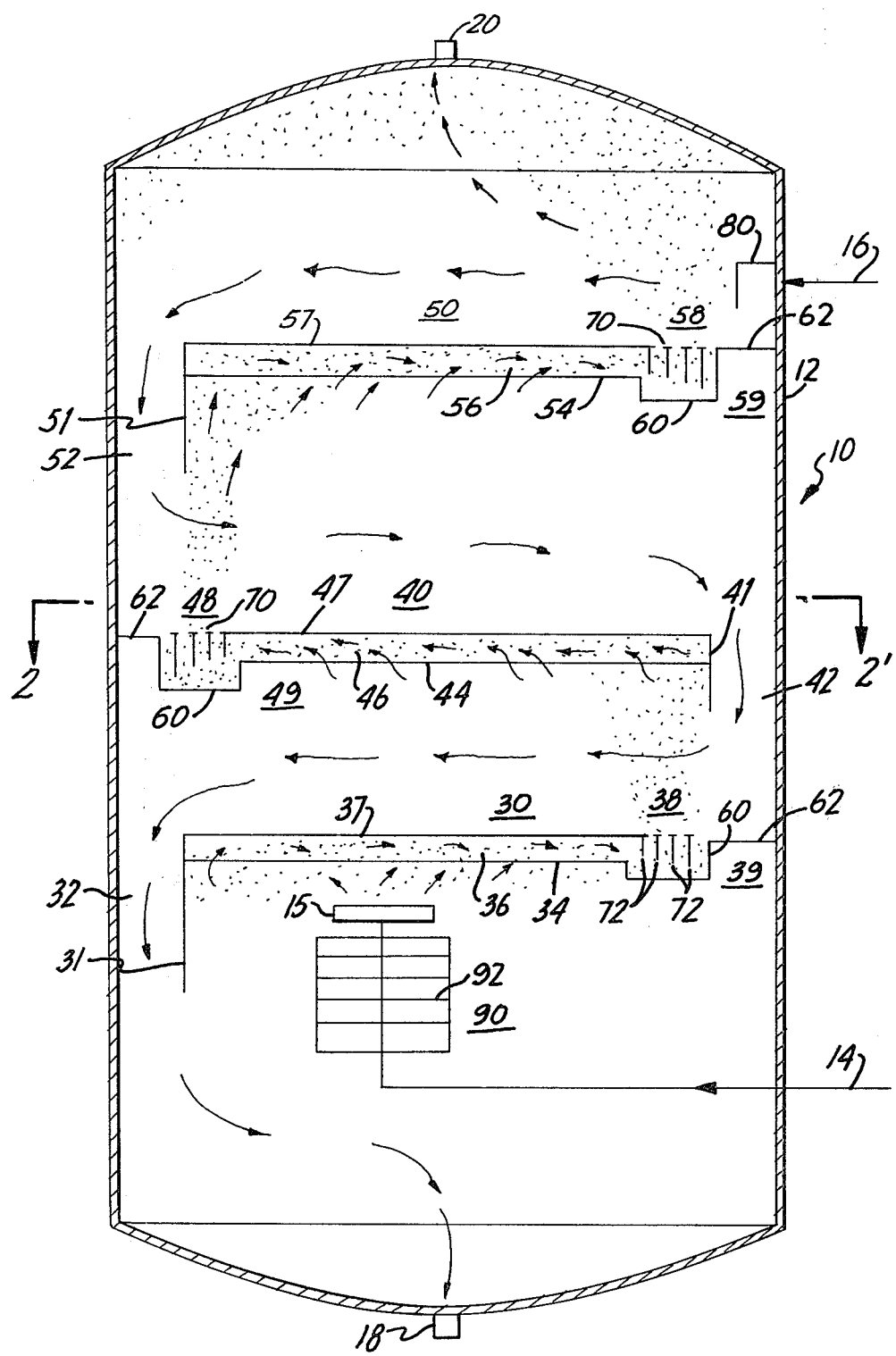
FIG. 1 is a simplified sectional view of a single pass extraction zone utilizing the present invention.
Figure 2:
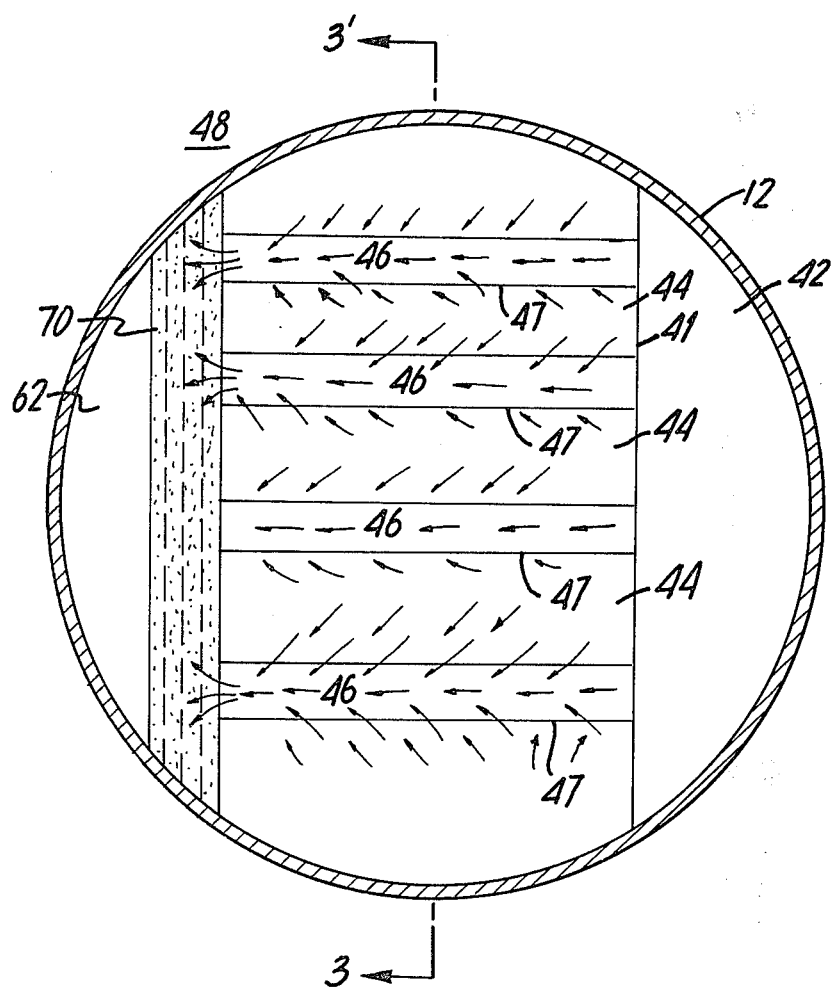
FIG. 2 is a plan view taken along line 2—2' of FIG. 1.
Figure 3:
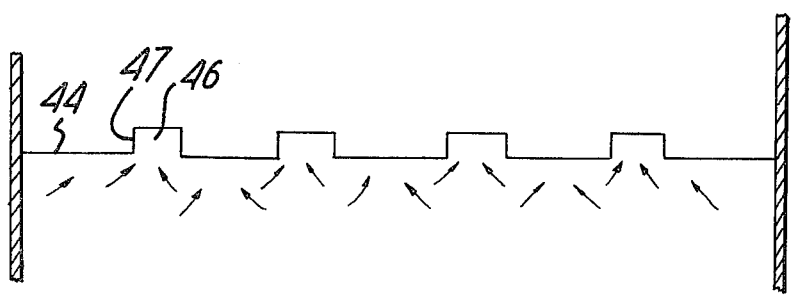
FIG. 3 is an elevation view taken along lines 3—3' of FIG. 2.

Referring to FIGS. 1, 2 and 3, simplified section, plan and elevation drawings are shown of an extraction zone incorporating the present invention. Extraction zone 10 is shown comprising a tower 12, having a feed inlet 14, solvent inlet 16, extract outlet 18 and raffinate outlet 20. Feed inlet 14 is shown extending into tower 10 and terminating at diffuser means 15. In this description it is assumed that the solvent is of a higher specific gravity than the feed. Where the solvent is less dense than the feed, the locations of the inlets 14 and 16 would be reversed as would the locations of outlets 18 and 20. Tower 12 is shown having three substantially horizontally disposed, vertically spaced apart tray means, such as trays 30, 40 and 50 having tray decks 34, 44, 54, respectively. Affixed to the outer periphery of trays 30, 40, 50 are vertical extending sections 31, 41, 51, respectively, which cooperate with the inner surface of tower 12 to define downcomer means 32, 42, 52 for directing the flow of solvent from each tray to a location beneath that tray.

Channel means 37, 47, 57 associated with trays 30, 40, 50, respectively, cooperate with the respective trays to define fluid conduits 36, 46, 56, respectively which are open at the bottom to permit settled light phase to enter along the entire length of the conduit. The end of each channel means 37, 47, 57 opposite the associated weir means 38, 48, 58, respectively is sealed by a dentil projection on vertical extending sections 31, 41, 51, respectively. Affixed to the outer perimeter of trays 30, 40, 50 are weir means 38, 48, 59, respectively, each comprising a perforate means, such as perforate phase 70. Each perforate plate 70 preferably has depending therefrom a series of substantially horizontally disposed, spaced apart, vertically depending sections such as sections 72. The vertically depending sections are disposed spaced apart in the flow path of the light phase, preferably about 1 to about 3 inches apart, the depth of the sections preferably increasing with increasing distance from the terminus of the associated channel means. The depth of first, or shortest, segment 72 is preferably below the tray level so that fluid conduits 36, 46, 56 are filled with light phase down to the level of tray decks 34, 44, 54, respectively. Perforate plate 70 preferably is disposed at a height between about 5% and about 50% of the vertical tray spacing above the associated tray deck. Typically perforate plate 70 is disposed at a height of about 2 inches to about 8 inches above the associated tray. With this arrangement, the interface between the light phase and heavy phase in the space between trays is somewhat below the upper tray deck surface. Seal means 39, 49, 59, associated with weir means 38, 48, 58, respectively, each comprises a generally U-shaped member 60 and a chordal shaped member 62 extending between the inner circumference of tower 12 and U-shaped member 60. In the embodiment shown, the weir means and downcomer means for vertically adjacent trays preferably are disposed on opposite sides of tower 12 to create a cross-flow pattern in the tower. As shown in FIGS. 2 and 3, channel members 37, 47, 57 may comprise a plurality of channel members on each tray means to maintain the fluid flow rate through each channel member below a predetermined limit, and to provide adequate mechanical strength for the flat tray decks 34, 44, 54 across tower 12. Although the fluid conduits have been described as imperforate, it is understood that this term will incorporate fluid conduits having one or more weep holes to permit the release of entrapped air when extraction zone 10 is first filled with liquid.

In the following description of the operation of the present invention, it will be assumed that the feed, such as a crude oil vacuum tower sidestream, is of a lower specific gravity than the solvent, such as phenol or N-methyl pyrrolidone (NMP). In this configuration the continuous phase in extraction zone 10 is the heavy, solvent phase. The main interface between the oil and solvent phases is above top tray 50 and, preferably, somewhat above solvent inlet 16, where it may be maintained by regulating the solvent inlet rate and/or regulating the solvent outlet rate. The feed enters tower 12 through line 14 and diffuser means 15 to form a light phase layer, indicated by the small dots, at tray 30. The light phase, or less dense liquid, travels in the direction shown by the shorter arrows, passing into and along fluid conduit 36 into seal means 39. The light phase then passes under one or more vertically extending sections 72, and thence upwardly through the relatively small perforations in plate 70 of weir means 38, which restrict the quantity of the light phase flowing upwardly through the space between sections 72. This prevents recirculation of the heavy phase from one tray back to the tray above. In passing through perforate plate 70, which preferably is substantially horizontally disposed, the light phase is broken up into small droplets which rise through the heavy phase and coalesce into another light phase layer beneath tray 40. The light phase then travels horizontally in a diagonal direction above tray 40 into and along fluid conduit 46 in the direction shown by the shorter arrows. Fluid conduit 46 preferably is maintained full by the first vertical section 72 of weir means 48. The light phase enters weir means 48 through the open end of fluid conduit 46. After entering weir means 48 the light phase flows horizontally to fill the entire chord of weir means 48. The light phase again passes through perforate plate 70 and is dispersed into small droplets which again rise through the heavy phase and coalesce into a light phase at tray 50. The light phase then flows above tray 50 into and along fluid conduit 56 after which it passes through cascade weir means 58. This process of droplet formation and coalescence is repeated at each tray in the column until the light phase exits through outlet 20.

Simultaneous with the upward passage of the light phase through tower 10, a heavy phase largely comprising the denser liquid entering through inlet 16 passes downwardly around baffle 80, as shown by the longer arrows, contacting the light phase droplets rising from perforate plate 70 of weir means 58. This heavy phase passes to the left above tray 50, and flows downwardly through downcomer means 52. After passing through downcomer means 52, the heavy phase contacts droplets rising from perforate plate 70 of weir means 48. The heavy phase then travels to the right above tray 40 after which it passes through downcomer means 42. The heavy phase then travels to the left above tray 30 and passes through downcomer means 32. This downward cross flow of the heavy phase is repeated at each stage in tower 12. At each stage the solvent contacts the rising droplets for effective mass transfer. A build-up of uncoalesced light phase droplets, which may be entrained in the heavy phase leaving the tower, is reduced by the use of coalescer means 90 beneath the lowermost tray such as tray 30, which promotes coalescence due to the added surface area and oil wettability characteristics. Coalescer means 90 preferably comprises a series of dual material screens 92 which are disposed in tower 12 below diffuser means 15.

Figure 4:
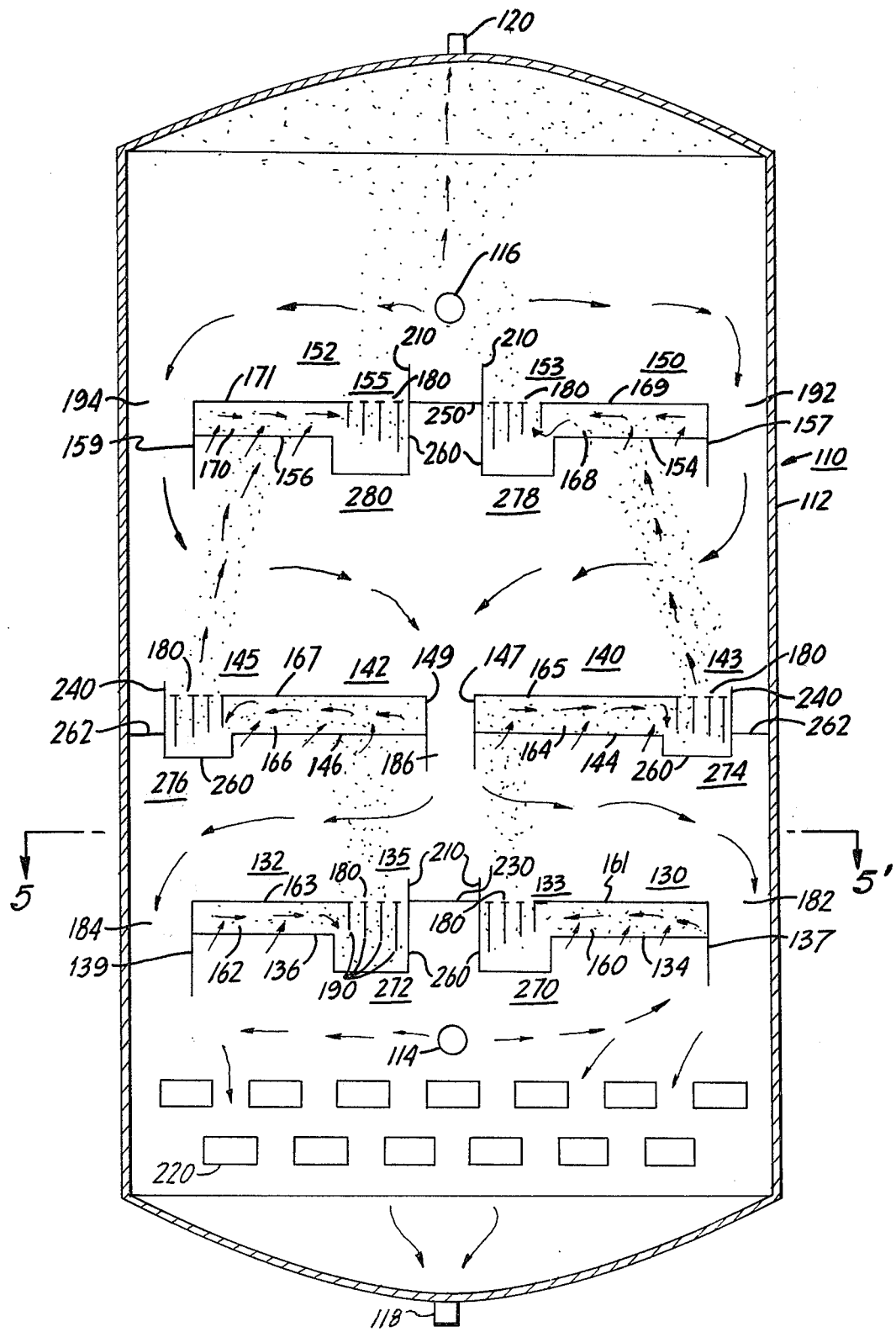
FIG. 4 is a simplified sectional view of a double pass extraction zone utilizing the present invention.
Figure 5:
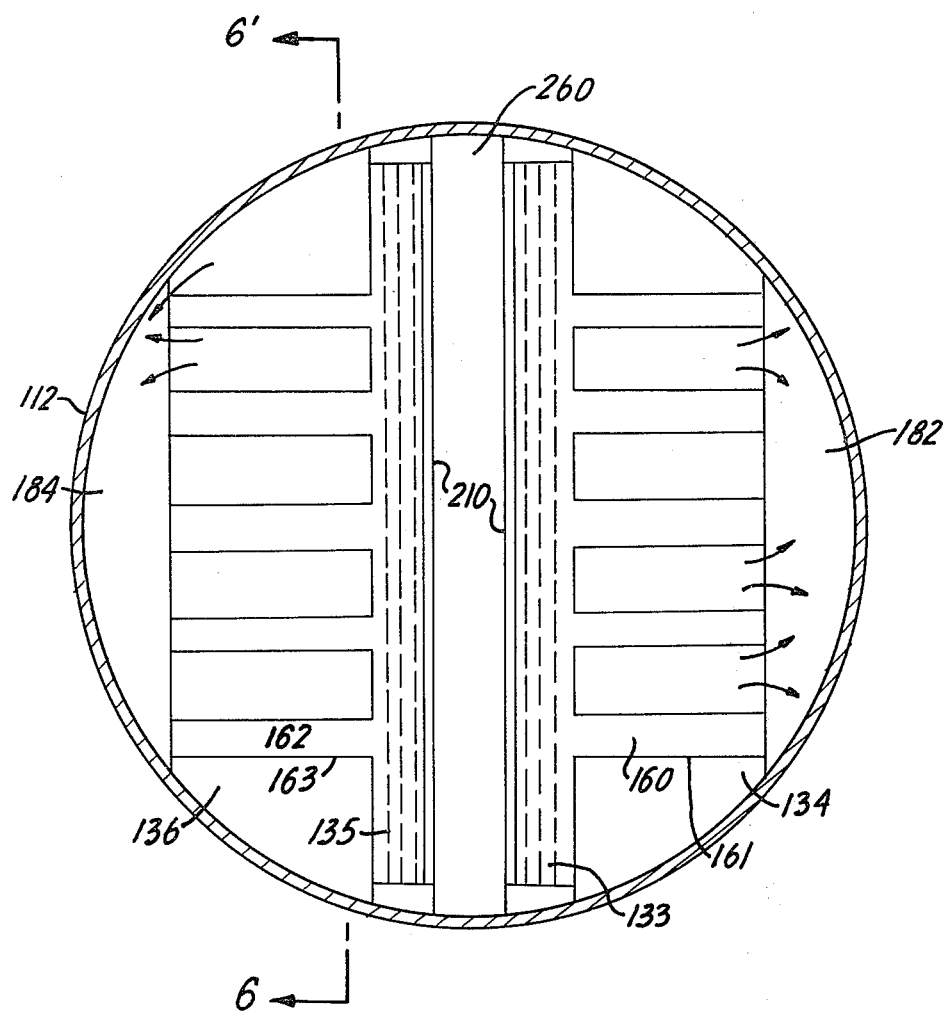
FIG. 5 is a plan view taken along lines 5—5' of FIG. 4.
Figure 6:
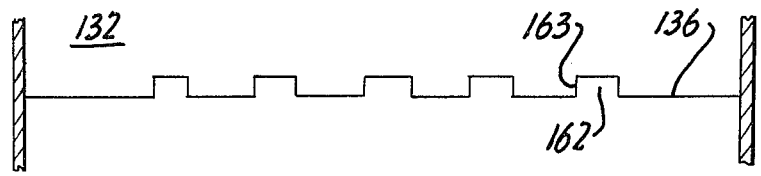
FIG. 6 is an elevation view taken along line 6—6' of FIG. 5.

Referring to FIGS. 4, 5, and 6 simplified section, plan and elevation views of a double pass countercurrent flow extraction zone 110 are shown. In this embodiment it again will be assumed that the solvent is more dense than the feed. In this embodiment again the light phase is indicated by the small dots and the flow path of the light phase is indicated by the relatively short arrows, while the flow path of the heavy phase is indicated by the longer arrows. Tower 112 is shown having a feed inlet 114, solvent inlet 116, extract outlet 118 and raffinate outlet 120. Tower 112 has a series of horizontally disposed, vertically spaced apart tray means. Each tray comprises a pair of tray halves or segments installed at the same level, such as tray segments 130 and 132, 140 and 142, 150 and 152, having tray decks 134 and 136, 144 and 146, 154 and 156, respectively. Channel members 161, 163, 165, 167, 169, 171 cooperate with tray decks 134, 136, 144, 146, 154, 156, respectively to form fluid conduits 160, 162, 164, 166, 168, 170, respectively, which are open at the bottom as shown in FIG. 6. A pair of tray segments, such as tray segments 130 and 132, are shown installed at the same elevation. Fluid conduits, such as fluid conduits 160, 162, respectively, direct the light phase from beneath each tray segment to cascade weir means 133, 135, respectively. The vertically adjacent cascade means preferably are horizontally spaced apart to compensate for the fact that the droplets do not rise vertically, but rather at an angle attributable to the horizontal motion of the continuous phase in which they are dispersed. Spacing apart weir means 133, 135 minimizes the amount of light phase fluid which passes up through downcomer means 186 thereby by-passing tray segments 140, 142. Cascade weir means 133, 135 each preferably comprises a substantially horizontally disposed perforate plate 180. Beneath each perforate plate 180 are a series of vertically depending sections 190 which preferably increase in depth with increasing distance from the terminus of fluid conduits 160, 162 to regulate the flow of fluid through perforate plate 180 as previously described. Tray decks 144 and 146, and channel members 165, 167 disposed above cascade weir means 133, 135 respectively, redirect the upwardly flowing fluid streams outwardly through fluid conduits 164, 166, respectively, and into weir means 143, 145, respectively, through an opening in each fluid conduit.

Weir means 143, 145 each also comprises a perforate plate 180, and a series of vertically depending sections 190, with the depth of the sections preferably increasing gradually with increasing distance from the terminus of fluid conduits 164, 166, respectively. Fluid passing upwardly through perforate plates 180 of weir means 143, 145, is redirected by tray decks 154, 156, respectively through fluid conduits 168, 170, respectively, into cascade weir means 153, 155. Seal means 270, 272, 274, 276, 278, 280 associated with weir means 133, 135, 143, 145, 153, 155, respectively, each preferably comprises a generally U-shaped member 260. Some seal means, such as seal means 270, 272, 278 and 280 have a common member. Member 230 is shown common to seal means 270 and 272, while member 250 is shown common to seal means 278 and 280. Common members 230, 250 provide a spacer between the adjacent weir means which prevents droplets from passing through the vertical downcomer means, and thereby bypassing tray segments in the tower. Other seal means, such as seal means 274, 276 comprise chordal shaped members 262 extending between the inner surface of tower 112 and the adjacent U-shaped members 260. Chordal shaped members 262 are sufficiently wide to permit the adjacent cascade weir means, such as cascade weir means 143, 145, to be of a sufficient length.

Simultaneously, with the upward flow of the light phase, the more dense liquid enters tower 112 through solvent inlet 116 and passes over surface 250 and thence onto tray segments 150, 152. The vertically adjacent tray segments preferably have the downcomer means non-aligned to thereby redirect the heavy phase across the tray segments. Where one tray preferably has the downcomer means disposed at the outer perimeter of the tray, the vertically adjacent tray preferably will have the downcomer means disposed at the center of the tower. In the embodiment shown in FIGS. 4, 5 and 6 vertically extending sections 137, 139, 157, 159 of tray segments 130, 132, 150, 152, respectively, each cooperate with the inner surface of tower 112 to define downcomer means 182, 184, 192, 194, respectively. Similarly, vertically extending sections 147, 149, associated with tray segments 140, 142, respectively, cooperate to define downcomer means 186. Common member 250 communicating with seal means 278, 280, and common member 230 communicating with seal means 270, 272 each have baffles 210 to minimize direct impingement of the downflowing heavy phase on lube oil droplets being formed. Similarly, baffles 240 are disposed above the inner edge of seal means 143, 145 to minimize direct impingement of the downflowing heavy phase from downcomer means 192, 194 on lube oil droplets being formed. Coalescing means, such as coalescing screens 220, may be installed near the base of tower 112 to facilitate coalescence and separation of light phase droplets as hereinbefore indicated before the heavy phase exits from the tower. Screens 220 preferably are disposed in a checkerboard type arrangement to permit the downwardly flowing heavy phase to flow through the coalescence screens when the screens are relatively clean, but also to readily by-pass screens 220 if the screens become fouled with dirt, scale, corrosion by-products, etc.

Operation of the above described double-pass countercurrent flow cascade weir type extraction zone is described as follows for a system where the less dense feed is a lube oil feed and the more dense material added is a solvent, such as phenol or NMP. In this embodiment the solvent phase again is maintained as the continuous phase. The principal interface between the oil and solvent phases is maintained above the top tray segments 150, 152 and preferably above solvent inlet 116 by regulation of the solvent inlet and/or outlet rates. Lube oil enters tower 112 through oil inlet distributor 114, collects under tray segments 134, 136, and passes through fluid conduits 160, 162, into cascade weir means 133, 135, respectively through openings at the inner ends of the conduits. The light, primarily lube oil phase flows beneath vertical sections of 190 and passes upwardly through perforate plate 180 of weir means 133, 135. If the level of the lube oil phase in cascade weir means 133, 135 deepens as the feed rate is increased, lube oil will flow beneath additional vertical sections 190, before passing through perforate plate 180. The lube oil level in cascade weir means 133, 135 determines the degree to which perforate plate 180 is utilized for transforming the lube oil layer into tiny droplets. Lube oil droplets exiting from perforate plate 180 of weir means 133, 135 are contacted by the downflowing heavy phase, primarily comprising solvent, which has passed through downcomer means 186 to effect mass transfer of some lube oil impurities, such as aromatics, from the lube oil phase to the solvent phase. The lube oil droplets pass upwardly where they coalesce into a lube oil phase beneath tray segments 140 and 142. The lube oil flows into fluid conduits 164, 166, respectively, and is then transported outwardly to cascade weir means 143, 145, respectively, through openings in the outer ends of the conduits. The lube oil passes through perforate plates 180 of weir means 143, 145, to disperse and then recoalesce at tray segments 150, 152, respectively. The lube oil then is directed through fluid conduits 168, 170, and cascade weir means 153, 155, respectively. This process is repeated at each stage in extraction zone 110 until the lube oil exits tower 112 through raffinate outlet 120.

Solvent enters tower 112 near the top through inlet 116 and flows downwardly extracting soluble impurities from the lube oil as previously described. Downwardly flowing solvent flows horizontally over common member 250 and baffles 210 and then across perforate plate 180 of cascade weir means 153, 155 where it contacts droplets passing through the perforate plate. Common member 250 and baffles 210 prevent direct impingement of the solvent on the perforate plate 180 where the lube oil droplets are being formed. This permits the formation of lube oil droplets of a sufficiently large size with a minimum of exceptionally small droplets, which are not desired. The smaller droplets, which tend to rise more slowly out of the solvent, and coalesce more slowly, would be likely to be entrained with downwardly flowing solvent. The solvent then passes above tray segments 150, 152, and passes through downcomer means 192, 194, respectively, after which it contacts droplets rising from cascade weir means 143, 145, respectively, to effect additional mass transfer of a portion of the impurities from the lube oil fraction to the solvent. The solvent passes across tray segments 140 and 142 and through downcomer means 186. The solvent then removes additional soluble impurities from the lube oil fraction passing upwardly from perforate plates 180 of weir means 133, 135. The solvent passes across tray segments 130, 132, through downcomer means 137, 139, respectively, after which the solvent passes through coalescing screens 220 and outlet 118. Minor amounts of lube oil entrained in the solvent may separate from the exiting solvent as the solvent passes through coalescing screens 220. This lube oil rises in the form of droplets and accumulates at tray segments 130, 132 after which it passes through fluid conduits 160, 162 for further contacting along with the feed entering through inlet 114.

While the extraction zones described above are single pass or double pass towers, it is clear that the aforementioned invention is equally applicable to towers having more than two passes. While the single pass and double pass extraction towers shown herein each comprised three trays, for simplicity, commercial extraction towers typically will comprise from about 10 to 30 trays.

Although the present invention has been described with respect to the channel members disposed above the tray decks, it may be desired to have some or all of the channel members and the resulting fluid conduits beneath the associated tray deck in systems where the heavy phase is dispersed and the light phase is continuous. In such cases weir means 133, 135, 143, 145, 153, 155 would be inverted from the positions shown in FIG. 4. As indicated herein, each tray may have one or more channel members. The size, number, location and wall thickness of channel members associated with each tray will be a function of tray hydraulics and the mechanical strength support requirements of the tray means.

While the present invention has been shown to be effective for lube oil-solvent systems, it is apparent that this invention is equally applicable to other extraction applications.

What is claimed is:

1. A tray means for a liquid-liquid extraction zone, said tray means comprising:
   (A) a tray deck;
   (B) a downcomer means disposed adjacent to said tray deck, said downcomer means adapted to pass a heavy phase liquid downwardly from above said tray deck to below said tray deck;
   (C) a weir means disposed spaced apart from said downcomer means, said weir means adapted to disperse a light phase into a plurality of droplets which pass upwardly through the downwardly flowing heavy phase; and,
   (D) a generally U-shaped channel means extending from said downcomer means to said weir means and communicating with said tray deck to form a fluid conduit, whereby the upwardly flowing light phase passes through the fluid conduit into the weir means.

2. The tray means of claim 1 wherein said weir means comprises a cascade weir means.

3. The tray means of claim 2 wherein said cascade weir means comprises a perforate plate, the light phase being dispersed into a plurality of droplets by said perforate plate.

4. The tray means of claim 3 further comprising a plurality of spaced apart, vertical sections depending from said perforate plate, said vertical sections adapted to regulate the flow of light phase through said perforate plate.

5. The tray means of claim 3 wherein said channel means comprises a plurality of channel means.

6. The tray means of claim 5 wherein the channel means is imperforate.

7. The tray means of claim 5 wherein at least one of said channel means is disposed above said tray deck.

8. The tray means of claim 5 wherein substantially all the mechanical strength support requirements for said tray deck are provided by said channel means.

9. An extraction zone for the separation of a feed having a first component and a second component by contacting the feed with a solvent having a density differing from that of the feed to thereby form a relatively light phase and a relatively heavy phase, said extraction zone of the type comprising:
   (A) a tower having vertically spaced-apart feed and solvent inlets and vertically spaced-apart light phase and heavy phase outlets;
   (B) a tray means disposed in said tower, said tray means comprising:
      (i) a tray deck;
      (ii) a downcomer means disposed adjacent to said tray deck adapted to pass the heavy phase downwardly from above said tray deck to below said tray deck;
      (iii) a weir means disposed spaced-apart from said downcomer means, said weir means adapted to disperse a light phase into a plurality of droplets which pass upwardly through said downwardly flowing heavy phase; and,
      (iv) a generally U-shaped channel means extending from said downcomer means to said weir means, said channel means communicating with said tray deck to form a fluid conduit, whereby the upwardly flowing light phase passes through the conduit into the weir means.

10. The extraction zone of claim 9 wherein the tray means and the inner surface of said tower cooperate to define said downcomer means.

11. The extraction zone of claim 9 wherein said tray means comprises a plurality of tray means.

12. The extraction zone of claim 11 wherein vertically adjacent downcomer means are disposed in horizontally spaced-apart relationship, the heavy phase flowing across said tray deck in passing between vertically adjacent downcomer means.

13. The extraction zone of claim 12 wherein vertically adjacent weir means are disposed in horizontally spaced-apart relationship, the light phase flowing into and through said weir means in passing between vertically adjacent tray means.

14. The extraction zone of claim 13 wherein said extraction zone is a single-pass extraction zone.

15. The extraction zone of claim 13 wherein said extraction zone is a multiple-pass extraction zone.

16. The extraction zone of claim 15 wherein the feed is a lube oil and the solvent is selected from the group consisting of NMP and phenol.

* * * * *